United States Patent [19]

MacDonald

[11] Patent Number: 5,376,786
[45] Date of Patent: Dec. 27, 1994

[54] OPTOELECTRONIC TRANSVERSAL FILTER WITH VARIABLE GAIN BI-POLAR TAPS

[75] Inventor: R. Ian MacDonald, Edmonton, Canada

[73] Assignee: Telecommunications Research Laboratories, Canada

[21] Appl. No.: 51,475

[22] Filed: Apr. 22, 1993

[30] Foreign Application Priority Data

Jun. 23, 1992 [CA] Canada ............................ 2072052

[51] Int. Cl.$^5$ .................................................... H01J 5/16
[52] U.S. Cl. .................................. 250/227.12; 250/205
[58] Field of Search .................. 250/227.12, 227.19, 250/205; 359/161, 173, 195, 629; 385/14, 27, 28, 1, 15

[56] References Cited

U.S. PATENT DOCUMENTS

| | | |
|---|---|---|
| 4,128,759 | 12/1978 | Hunt et al. |
| 4,166,212 | 8/1979 | Judeinstein |
| 4,686,533 | 8/1987 | MacDonald et al. |
| 4,696,059 | 9/1987 | MacDonald et al. |
| 4,976,518 | 12/1990 | Burns ........................ 385/27 |
| 5,235,455 | 8/1993 | Berry et al. ................ 385/14 |

FOREIGN PATENT DOCUMENTS 2191646A 12/1987 United Kingdom.

OTHER PUBLICATIONS

Optoelectronic Transversal Filter by R. I. MacDonald et al Electronics Letters, vol. 27, No. 19, Sep. 12, 1991; pp. 1769–1770.

Photodetector sensitivity control for weight setting in optoelectronic neural networks by R. R. MacDonald et al Applied Optics, vol. 30, No. 2, Jan. 10, 1991; pp. 176–178.

Optoelectronic Switching by R. I. MacDonald IEEE Communications Magazine, vol. 25, No. 5, May 1987; pp. 33–36.

*Primary Examiner*—David C. Nelms
*Assistant Examiner*—Que T. Le
*Attorney, Agent, or Firm*—Hayes, Soloway, Hennessey, Grossman & Hage

[57] ABSTRACT

An improved fiber optic delay line filter is disclosed having each fiber optic light path terminate on a corresponding photo detector adapted to convert the received optical signal to a commensurate electrical signal in bi-polar proportion to an electrical bias level provided to the photo detector where the bias level for each photo detector is independently settable and the outputs of all of the photodetectors are summed to produce an output electrical signal that is filtered by the arranged fiber optic delay line transversal filter.

11 Claims, 3 Drawing Sheets

OPTOELECTRONIC TRANSVERSAL FILTER WITH VARIABLE GAIN BI-POLAR TAPS

BACKGROUND OF THE INVENTION

The invention relates to apparatus for providing optoelectronic transversal filters, in particular an optoelectronic transversal filter with variable gain bipolar taps.

Transversal filters operate by passing the signal to be filtered through multiple paths such that the propagation times of the signal through each path differs, usually by a constant time interval. The delayed versions of the signal are then recombined to form the output signal. The magnitude or proportion of each delayed signal is controlled in the combination process to provide control over the filter properties. Transversal filters may be of the "finite impulse response" type or the "infinite impulse response type", depending on whether or not the output signal is re-injected into the delay paths.

Transversal filters require delay paths which retain adequate bandwidth to pass the signal to be filtered, and methods of launching and recovering signals onto these paths. A widely used technology is that of surface acoustic waves (SAW). SAW transversal filters employ a single delay propagation path from which signals are tapped at intervals along its length. The input signal to the filter is piezoelectrically launched as an acoustic wave in a suitable crystal. The weighted recombination process of the transversal filter consists of the recovery of the acoustic signal using multiple piezoelectric electrodes distributed along the path of the acoustic wave. Because the propagation velocity of the acoustic wave is relatively slow, significant delays can be obtained in a physically small device.

SAW filters cannot be used for very wideband signals for several reasons. First, the bandwidth of a transversal filter is set by the time interval between taps, which becomes shorter for wider bandwidth filters. For very wideband filters, the slow propagation of the acoustic wave becomes a disadvantage because the taps become too close together for practical implementation. Second, the propagation of the acoustic wave may be sufficiently dispersive that insufficient bandwidth is available in the delay path itself. Current limitations on advanced SAW filters indicate a center frequency of 1 GHz with a 30% bandwidth.

To overcome the dispersion and propagation delay constraints of SAW transversal filters, optical fiber delay line transversal filters have been proposed as, for example, the Fiber Optic Delay Line Filter of Hunt et al. disclosed in U.S. Pat. No. 4,128,759 issued on Dec. 5, 1978. In the Hunt apparatus the signal to be filtered is converted into an optical signal by laser or light emitting diode. The optical signal is then injected into a plurality of fiber optic paths that all terminate on a photodector which serves to sum the optical signals and convert them back into an electrical signal. Each optical path of the Hunt apparatus is provided with an independently operable optical attenuator to control the intensity of the light allowed to pass along its associated fiber optic delay line. A variant apparatus is disclosed by Judeinstein in U.S. Pat. No. 4,166,212 titled Recirculating Optical Delay Line issued on Aug. 28, 1979 where a single fiber optic path is used reiteratively to provide multiple delay paths each path having an integer multiplied delay of the basic delay caused by a single passage of the light through the fiber optic delay path.

The foregoing patents typify the fiber optic delay line transversal filters found in the art. The method of summing the delay signals is simply to deliver the light from all delay lines to the same photodector. This approach is problematic in certain instances where high bandwidth is required. The efficient collection of light from multiple sources into a single detector is difficult for high bandwidths because of size constraints in the detector to maintain low capacitance. Moreover, the tap weights of each delay line must be set to predetermined values to obtain the filter effects desired. This is achieved in the prior art by including a device of controllable transmittance, such as a spatial light modulator, in the optical path. Such optical path devices have several constraints associated with them including: limits on the dynamic range of the weights, limits on the resolution of the weights, constraints on the speed with which the weights may be changed or updated. Also, where electrically controllable optical directional couplers are used for controlling the tap weights, the type of fiber optic cable is then restricted to a singlemode fiber. Single mode propagation can result in optical interference if the delays required require fiber optical path differences that are shorter than the coherence length of the optical carrier in the fiber optic path. Where such delays are required, the delay-bandwidth requirements of the filter sought to be implemented could be met using multi-mode fibers which cannot operate with optical directional couplers.

Summary of the Invention

The optoelectronic transversal filter described here provides a wideband, low loss signal propagation which is characteristic of optical fibers to achieve very high speed signal processing capabilities in the order of several gigahertz that overcomes the limitations of the prior art by providing in one of its aspects a fiber optic delay line filter having an electro-optical transducer means for converting an input electrical signal to a corresponding optical signal and a plurality of fiber optic light paths arranged to receive and conduct said optical signal each said fiber optic path having a predetermined optical path length arranged to provide a fixed optical propagation delay, the improvement wherein: each said fiber optic light path terminates on a corresponding photo detection means adapted to convert the received optical signal to a commensurate electrical signal in bi-polar proportion to an electrical bias level provided to said photo detection means; bias means for production of independent electrical bias levels for each said photo detection means; and summation means for summing the electrical signals produced by said photo detection means to produce a single electrical output signal proportional to the sum of the input electrical signals.

The invention also relates to a fibre optic delay line filter having an input electrical signal power divider for producing two output electrical signals in phase quadrature to said input electrical signal, each said phase quadrature signal providing the electrical input to a corresponding electro-optical transducer means for converting said input electrical signal to a corresponding optical signal and a plurality of fibre optic light paths arranged to receive and conduct said optical signal, each said fibre optic light paths arranged to receive and conduct said optical signal, each said fibre optic path having a predetermined optical path length with a fixed optical propagation delay, the improvement wherein: each said fibre optic light path terminates on a corresponding photo detection means adapted to convert the received optical signal to a commensurate electrical signal in bi-polar proportion to an electrical bias level provided to said photo detection means; bias means for production of independent electrical bias levels for each said photo detection means; and summation means for summing the electrical signals produced by said photo detection means to product a single electrical output signal proportional to the sum of the input electrical signals; wherein the output of each summing means is connected to a final signal summing means for adding each said phase quadrature input signal to said filter to product a composite output signal.

The manner of construction and method of operation of the fiber optic delay line filter in accordance with the present invention will now be described in detail with reference to the accompanying drawings in which:

DESCRIPTION OF THE PREFERRED EMBODIMENT

Figure 1:
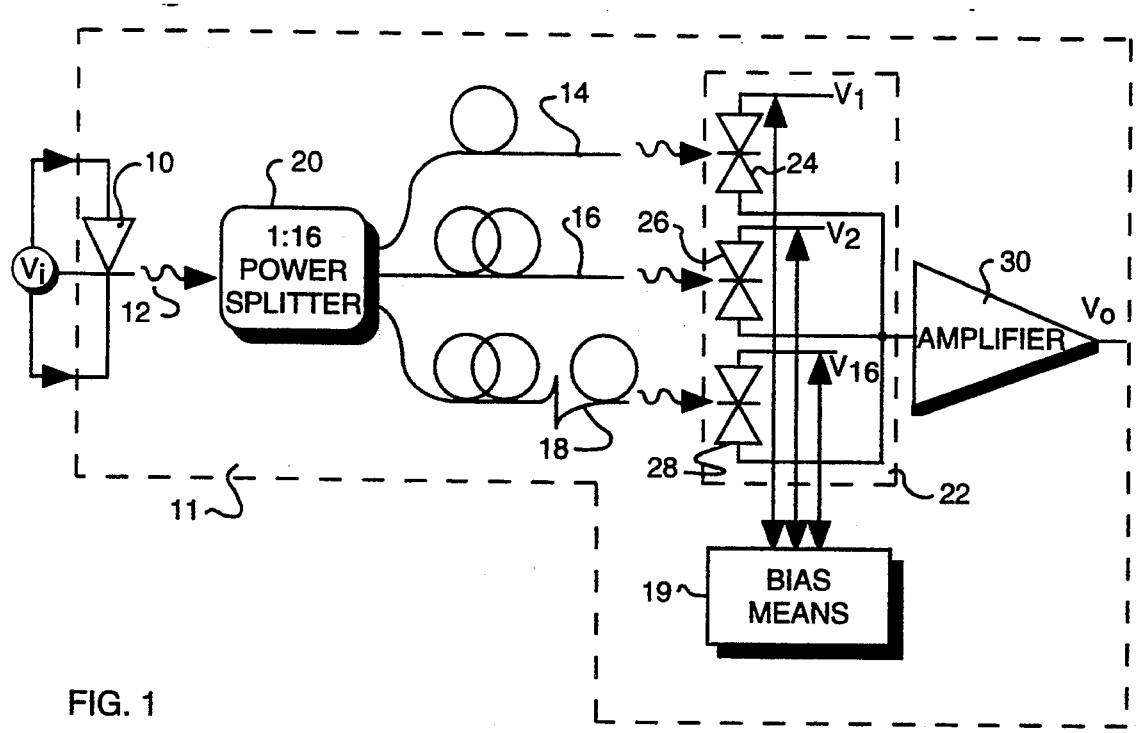
FIG. 1 is a functional block diagram of a filter constructed in accordance with the present invention.

Referring to FIG. 1, which shows a fiber, generally designated by reference numeral 11 optic delay line filter constructed in accordance with the present invention. An input temporally varying electrical signal $V_i$ is applied to the input terminal of an optoelectronic transducer 10 which is a laser diode, light emitting diode or optical modulator that will convert the incoming electrical signal into an optical intensity modulated signal 12. Optical fiber delay lines 14, 16 and 18 are then used for the delay paths required by transversal filters. These fiber optic delay lines provide very wideband, low dispersion delay to the optical signal carried therealong. In the preferred embodiment, the optical signal is split using an optical splitter 20 which is a commercially available optical fiber power splitter. The light from each output of the power splitter is coupled to a corresponding delay line and is carried therealong to terminate on a single detector array 22. The detector array 22 is provided with a corresponding number of individual photo detectors 24, 26 and 28 which preferably are interdigital metal-semiconductor-metal (MSM) GaAs photodiodes each having an active area of approximately 100 $\mu m^2$ and a channel spacing of 5 $\mu m$. These photodectors are fabricated in a linear array with a centre-to-centre spacing of 250 $\mu m$. Each of the delay line fibers 14, 16 and 18 are aligned with the detectors by first positioning them in "v" grooves etched in a silicon wafer. The fibers are then epoxied in place and the entire v-groove wafer is then aligned with the detector array. This is the preferred technique for alignment of the terminating ends of the delay line fibers with the detector array. With this alignment technique, uniformities of $\pm 1.5$ dB have been achieved in the detected electrical signal produced by the corresponding photodector 24, 26 and 28. The optical signals are converted back to electrical signals by the aforementioned photodectors terminating the end of each delay line. Recombination of the delayed signals is performed with the photocurrents produced by the photodectors after detection. The proportion of each delayed signal in the sum is controlled by controlling the detection efficiency of the photodetectors themselves by providing each detector with a bias control voltage depicted as $V_1$, $V_2$ and $V_{16}$. The bias control voltage is generated by bias voltage means 19. Voltage level $V_0, V_1 \ldots V_{16}$ for the photo detectors of array 22 may be adjusted both in amplitude and polarity. Use of MSM GaAs photodetectors as aforesaid enables each delay optical line signal to be converted to a selectable corresponding amplitude electrical signal that is positively or negatively proportional to the received electrical signal. In other words, the weighting assigned to each delay line signal can be implemented using bipolar weights. This is achieved with MSM detectors by reversing the polarity of the bias voltage which introduces a 180° phase shift in the detector output. All of the outputs of the photodetectors are summed together to provide the filter output $V_0$. This summing process can be provided by using an operational amplifier 30.

Figure 2:
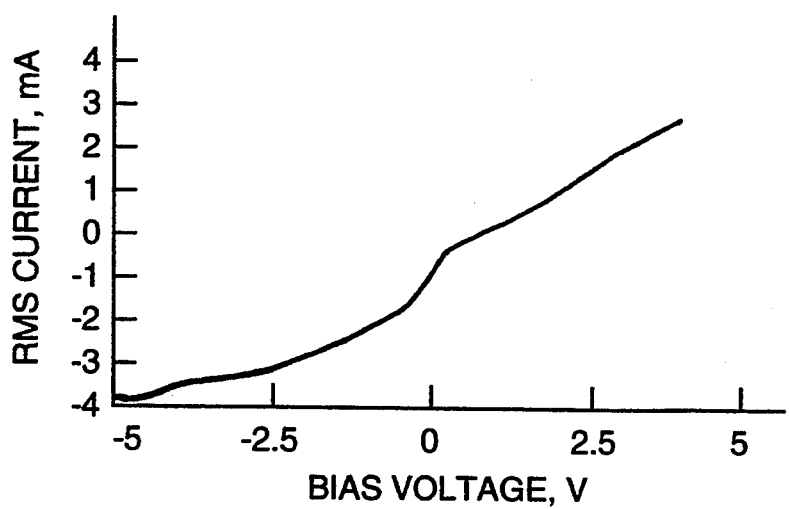
FIG. 2 is a chart showing the bipolar response of the photodectors of FIG. 1.

Referring to FIG. 2 an approximation of the voltage/current response of the MSM photodectors 24, 26 and 28 of FIG. 1 is shown in detail. By inspection of the graph, it is understood that the output currents of each photo detector is positively or negatively proportional to the incident optical signal received by the photodector depending on the magnitude and polarity of the bias voltage applied to the photodetector itself. Given that the photo detectors are bias controlled, and through the use of positive and negative voltage bias of each detector, the photo detector array can provide for both positive and negative contributions in the summation of the signals by summing amplifier 30 of FIG. 1 which produces the desired output signal $V_0$. Such bipolar weighting is required in transversal filters for bandpass filtering and other applications.

Figure 3:
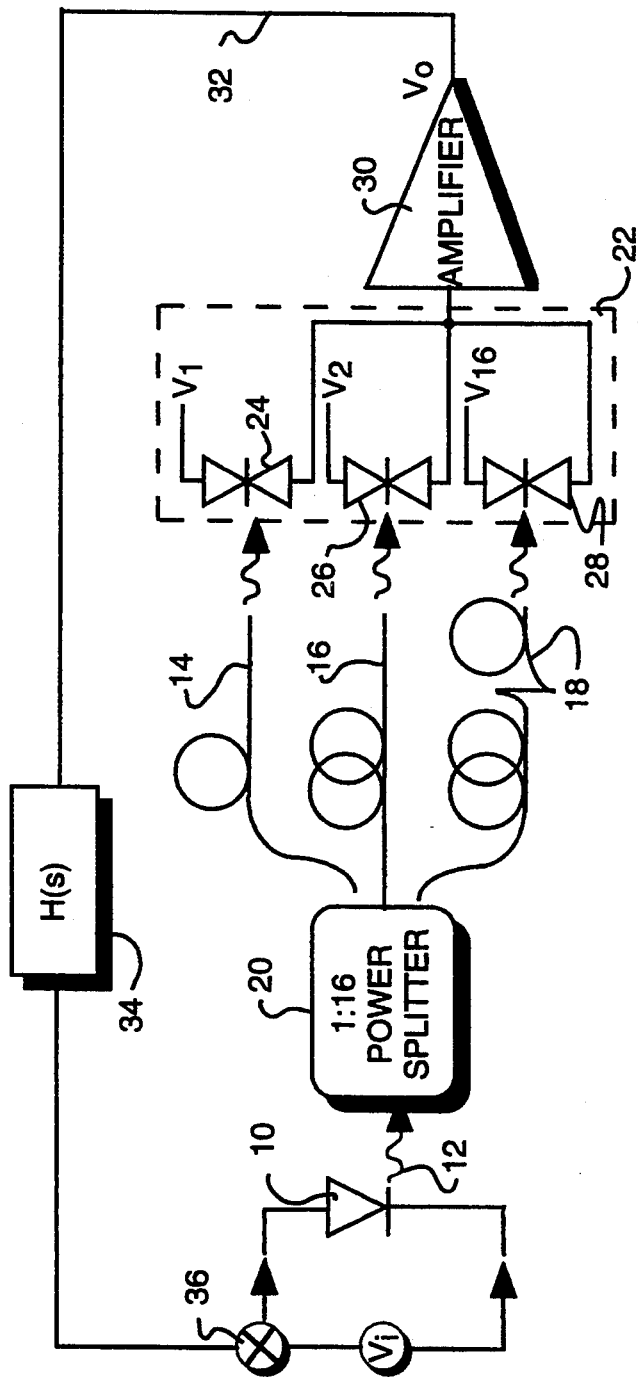
FIG. 3 is a functional block diagram of the filter shown in FIG. 1 including a feedback path.

Referring now to FIG. 3 the fiber delay line filter of FIG. 1 shown further including a closed-loop feedback path in 32 which is coupled to the input voltage $V_i$ after passing through a feedback path filter 34 having a transfer function H(s) which is designed to enhance the operation of the filter. The feedback path transfer function H(s) output voltage is then added to or subtracted from the input voltage $V_i$ at the feedback injection point 36 depending on the desired effect sought to be provided by introduction of the feedback in the filter.

Figure 4:
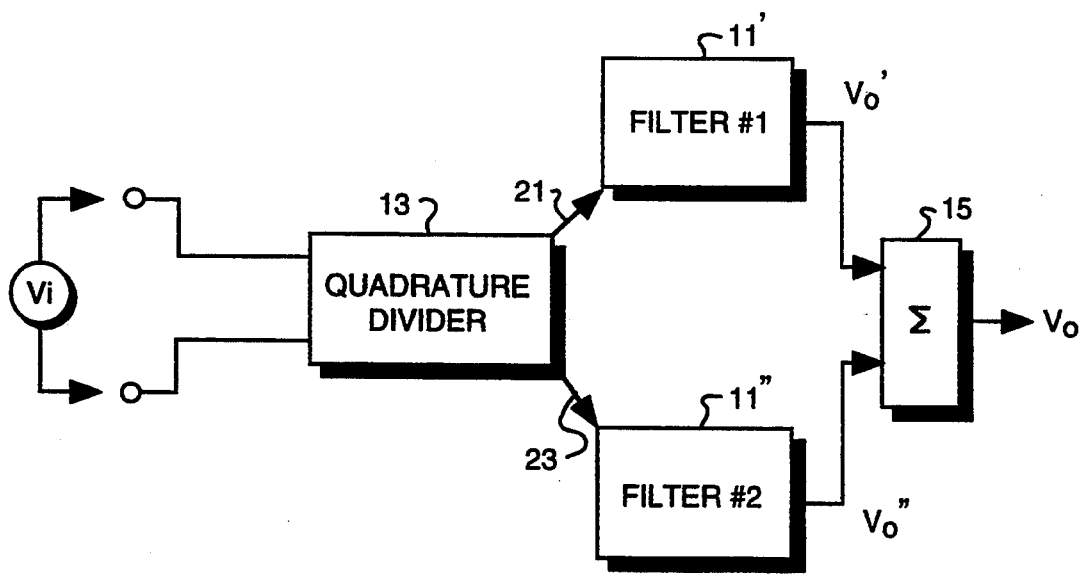
FIG. 4 illustrates a fibre optic delay line filter with complex weights.
Figure 5:
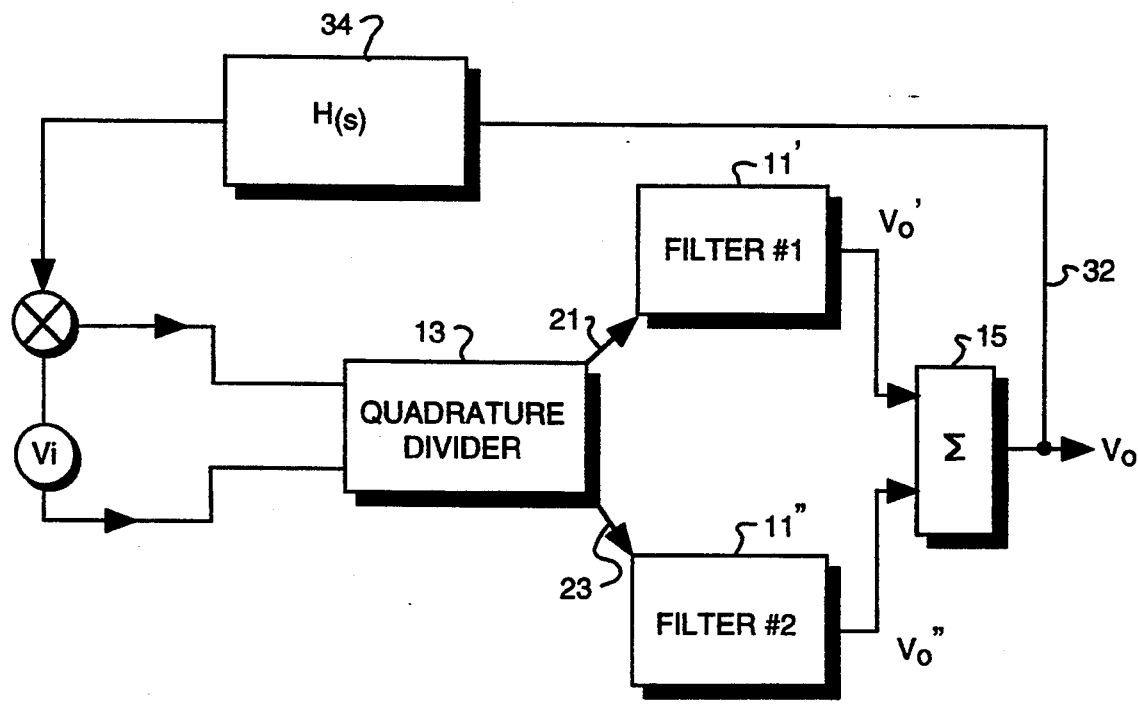
FIG. 5 shows a functional block diagram of the filter of FIG. 4 including a feedback path.

The systems illustrated in FIGS. 1 and 3 are directed to fibre optic delay line filter with real weights. FIGS. 4 and 5 illustrate systems using complex weights. In these embodiments, the fibre optic delay line filter is provided with an input electrical signal power divider 13 for producing two output electrical signals 21 and 23 in phase quadrature to the input electrical signal $V_1$. Each phase quadrature signal provides the electrical input to a corresponding electro-optical transducer means of the respective filter 11' and 11", for obtaining a corresponding optical signal. A plurality of fibre optic light paths in filters 11' and 11" receive and conduct the respective optical signal, each fibre optic path having a predetermined optical path length with a fixed optical propagation delay. As shown in the embodiment of FIG. 1, each fibre optic light path of filters 11' and 11" terminates on a corresponding photo detector which converts the received optical signal to a commensurate electrical signal in bi-polar proportion to the electrical bias level provided by the bias means 19. The bias means produces an independent electrical bias level $V_0$, $V_2$... or $V_{16}$ for each photo detector. Summation means, as for example amplifier 30 of FIG. 1, is also provided in each filter 11' and 11" for adding the electrical signals produced by all photo detectors of the respective array 22 to produce a single electrical output signal proportional to the sum of the input electrical signals. The outputs of the summation means, namely the output of filters 11' and 11", are connected to a final signal summation means 15 which combines signals $V_0'$ and $V_0''$ to produce a composite output signal $V_0$.

The fibre optic delay line filter illustrated in FIG. 5 includes an electrical feedback path 34 whereby a feedback signal 32 proportional to the electrical output of the final summation means 15 is added to the input electrical signal provided to the delay line filters, forming an infinite impulse response filter. As an alternative, the feedback signal 32 may be subtracted from the input electrical signal provided to the delay line filters.

It is understood that although the photodetectors 24, 26 and 28 of the subject invention have been described as preferably being metal-semiconductor-metals (MSM) GaAs photodiodes, other photodectors may be employed as well. For example, the photodectors may be constructed from semiconductor junction photodiodes and photoconductors. Both alternative constructions to the preferred embodiment of these photodectors may be employed to advantage in the apparatus described herein.

Now that the invention has been described and depicted in relation to a specific embodiment for the purpose of illustrating the manner in which the invention may be used to advantage, numerous substitutions and modifications will occur to those skilled in the art which should be considered to be within the scope of the invention as defined in the claims following.

I claim:

1. In a fiber optic delay line filter having an optoelectronic or electro-optical transducer means for converting an input electrical signal to a corresponding optical signal and a plurality of fiber optic light paths for receiving and conducting said optical signal, each said fiber optic light path having a pre-determined optical path length with a fixed optical propagation delay, the improvement comprising:
   a detector array having a like plurality of photo detection means, each of said photo detection means being connected to a corresponding one of said fibre optic light paths for converting said corresponding optical signal to a commensurate electrical signal in bi-polar proportion to an electrical bias level provided to said photo detection means;
   bias means for producing said electrical bias level for each said photo detection means;
   summation means for summing all said commensurate electrical signals produced by said plurality of photo detection means to produce a single electrical output signal; and
   an electrical feedback path for adding to said input electrical signal a feedback signal proportional to said single electrical output signal of the summation means.

2. A fiber optic delay line filter as claimed in claim 1 wherein said detector array is comprised of interdigital photoconductors.

3. A fiber optic delay line filter as claimed in claim 1 wherein said feedback signal proportional to said single electrical output signal of the summation means is subtracted from the input electrical signal provided to said delay line filter.

4. A fiber optic delay line filter as claimed in claim 1 wherein said detector array is comprised of interdigital metal-semiconductor-metal (MSM) GaAs photodiodes.

5. A fiber optic delay line filter as claimed in claim 1 wherein said detector array is comprised of interdigital semiconductor photodiodes.

6. In a fiber optic delay line filter having an input electrical signal power divider for producing two output electrical signals in phase quadrature to an input electrical signal, each said phase quadrature signal being input to a corresponding electro-optical transducer means for converting said output electrical signal to a corresponding optical signal and a plurality of fiber optic light paths which receive and conduct said optical signal, each said fiber optic light path having pre-determined optical path length with a fixed optical propagation delay, the improvement comprising:
   a detector array having a like plurality of photo detection means, each of said photo detection means being connected to a corresponding one of said fiber optic light paths for converting said optical signal delayed by said corresponding fiber optic light path to a commensurate electrical signal in bi-polar proportion to an electrical bias level provided to said photo detection means;
   bias means for producing said electrical bias level for each said photo detection means;
   summation means for summing all said electrical signals produced by said photo detection means to produce a single electrical output signal proportional to the sum of said electrical signals; and
   final signal summation means for adding said single electrical output signals of said summation means to produce a composite output signal.

7. A fiber optic delay line filter as claimed in claim 6 wherein said detector array is comprised of interdigital photoconductors.

8. A fiber optic delay line filter as claimed in claim 6 further including an electrical feedback path for adding a feedback signal proportional to said composite output signal of the final summation means to said input electrical signal provided to said fiber optic delay line filter thereby providing an infinite impulse response filter.

9. A fiber optic delay line filter as claimed in claim 6 wherein said feedback signal proportional to the electrical output of the final summation means is subtracted from the input electrical signal provided to said delay line filter.

10. A fiber optic delay line filter as claimed in claim 6 wherein said detector array is comprised of interdigital metal-semiconductor-metal (MSM) GaAs photodiodes.

11. A fiber optic delay line filter as claimed in claim 6 wherein said detector array is comprised of interdigital semiconductor photodiodes.

* * * * *